United States Patent [19]

Wichterle

[11] Patent Number: 4,626,388
[45] Date of Patent: Dec. 2, 1986

[54] METHOD FOR PRODUCING CONTACT LENSES BY CENTRIFUGAL CASTING

[75] Inventor: Otto Wichterle, Prague, Czechoslovakia

[73] Assignee: Ceskoslovenska Akademi Ved, Prague, Czechoslovakia

[21] Appl. No.: 822,677

[22] Filed: Jan. 23, 1986

Related U.S. Application Data

[63] Continuation of Ser. No. 715,436, Mar. 25, 1985, abandoned.

[30] Foreign Application Priority Data

Mar. 31, 1984 [CS] Czechoslovakia .................... 2434-84

[51] Int. Cl.⁴ ............................................ B29D 11/00
[52] U.S. Cl. ................................... 264/2.1; 264/311; 425/434; 425/808
[58] Field of Search ....................... 264/2.1, 310, 311; 425/808, 426, 430, 434

[56] References Cited

U.S. PATENT DOCUMENTS 4,516,924  5/1985  Rawlings .............................. 425/808
4,517,139  5/1985  Rawlings et al. .................... 425/808
4,517,140  5/1985  Rawlings .............................. 425/434

Primary Examiner—James Lowe
Attorney, Agent, or Firm—Hoffmann, Dilworth Barrese & Baron

[57] ABSTRACT

The invention pertains to a method for producing contact lenses by centrifugal casting in molds inserted as a vertical row into a rotating polymerization column. According to this method of production, objects of cylindric shape, corresponding to the casting molds by the diameter and height, are inserted between the casting molds, whereas the ratio of weight to volume of these objects is larger than 3.

20 Claims, No Drawings

METHOD FOR PRODUCING CONTACT LENSES BY CENTRIFUGAL CASTING

This is a continuation of co-pending application Ser. No. 715,436, filed on Mar. 25, 1985, now abandoned.

The invention pertains to a method for producing contact lenses by centrifugal casting in molds inserted as a vertical row into a rotating polymerization column.

A highly efficient continuous production of contact lenses can be carried out, according to Czechoslovak Pat. Nos. 138,871 and Czechoslovak Patent Application PV 1027-83, by polymerization casting in molds which pass through rotating vertical tubes. The precise rotation symmetry of the casting is secured in this method by the precise guiding of molds in rotating tubes, so that the inner section of the rotating tube has a noncircular shape, to which can be inscribed a circle with the center placed in the rotation axis and the diameter only by 0.01 to 0.3 mm larger than is the diameter of the circumferential cylindric surface of molds.

To cast ultrathin lenses, the axial position of all molds in the rotating column has to be maintained with a specially high accuracy, because relatively large differences in the thickness of thin edges of the lenses would occur at a minute deflection of a mold from the rotation axis and thus the lenses would be depreciated. Therefore, it is necessary to arrange a very narrow passage of molds through a precisely centered columns, particularly in such a case. However, it comes about then easily that the column exerts a resistance to the mold passage at no matter how small deviation in the shape of columns and this resistance is not overcome sufficiently by the weight of the passing row of columns and, consequently, the molds are held up in the column and a failure of the continuous operation of the whole equipment follows.

The above mentioned shortcomings are removed by the method for producing contact lenses by centrifugal casting according to the invention, in molds inserted as a vertical row into a rotating polymerization column, wherein objects of a cylindric shape, corresponding by the diameter and height to the casting molds, are inserted between the casting molds, whereas the ratio of weight to volume of these objects is larger than 3.

Metals and alloys of specific weight larger than 7 g/cm$^3$ are suitable as a material for making the cylindric objects, for example, tungsten, tantalum, lead, bismuth, nickel or copper, and their alloys, for example, bronze, brass, Monel alloy, lead-antimony, chromium-nickel and the like. A fair service make also cylinders from alloy steels or molds filled with a metal or alloy.

Because the weight of single casting mold is about 0.3 g as a rule and thus a column of about 25 molds weighs 7.5 g, loading of this column with a single metal cylinder of 15 g triples its weight and thus considerably contributes to the reliable passage of molds through the column. However, this effect may be multiplied if the molds are interlaid with the larger number of metal cylinders in the tubular magazines.

An automated charge of empty molds, arranged in the tubular magazines, with monomer mixture belongs to advantages of the centrifugal casting in vertical rotating columns. To realize this with molds, which are prepared for charging already with interlaid metal cylinders, it is necessary to adapt a cavity in these cylinders, which reaches to the same depth as the bottom of a casting surface of the casting molds. This means a loss of only about 10 to 20% in their weight. If the casting is carried out by photopolymerization, the monomer mixture dosed into the cavity of metal cylinders remains unpolymerized and enables easy cleaning and reusage of the cylinders.

The invention is further illustrated in the following example.

EXAMPLE

Polypropylene casting molds are provided with about 1 mm thick cylindric flat wall of the outer diameter precisely 17 mm and height 7 mm for the precide guiding through the polymerization column. The weight of single mold is 0.35 g and it is increased by the charge of monomer mixture by only 0.02 to 0.08 g. The free passage of columns through a polymerization column of inner diameter only by 0.02 mm larger than is the diameter of molds, often stopped because a small weight of the column row did not reliably overcome friction between the walls of column and molds. This unfavourable effect was prevented, if a cylinder of diameter 17 mm, height 7 mm and weight 17.4 g, made from the alloy of lead and antimony, was placed above each tenth to twentieth casting mold. This provision enables a failureless production of contact lenses even at such a tight passage of molds through the rotating column. This tightness allowed the precise centering of molds, which is the condition of the perfect symmetry of castings.

Similar service made also brass cylinders or also polypropylene molds poured to their upper edge with a low-melting alloy, e.g., Wood's metal.

I claim:

1. Method for producing contact lenses by centrifugal casting in molds inserted as a vertical row into a rotating polymerization column, wherein objects of a cylindric shape, which correspond by the diameter and height to the casting molds, are inserted between casting molds, whereas the ratio of weight to volume of these objects is larger than 3.

2. The method according to claim 1, wherein the cylindric objects made from a metal of specific weight larger than 7 g/cm$^3$ are inserted between the casting molds.

3. A method for producing a contact lens by centrifugal casting in molds inserted as a vertical row in a rotating column which comprises inserting at least one object of cylindrical shape substantially corresponding to the diameter and height of a mold between each mold or series of molds, the weight of such object being greater than the weight of a single mold and being sufficient to significantly counteract resistance to the descending passage of the mold or series in the column where such resistance is due to friction.

4. The method of claim 3 wherein the interior diameter of the column is no more than about 0.01 to 0.3 mm greater than the diameter of the molds.

5. The method of claim 3 wherein the ratio of weight to volume of said object to a single mold is greater than 3.

6. The method of claim 3 wherein the weight per unit volume of said object is greater than 7 g/cm$^3$.

7. The method of claim 3 wherein said object is fabricated from a metal or metal alloy selected from the group consisting of tungsten, tantalum, lead, bismuth, nickel, copper, steel, bronze, brass, Monel alloy, lead-antimony and chromium-nickel.

8. The method of claim 3 wherein said object is a casting mold filled with a metal or metal alloy.

9. The method of claim 8 wherein said metal alloy is Wood's metal.

10. The method of claim 3 wherein said object is insert between successive series of molds.

11. The method of claim 10 wherein several objects are inserted between successive series of molds.

12. The method of claim 3 wherein the mold is fabricated from polypropylene.

13. The method of claim 12 wherein the interior diameter of the column is no more than about 0.01 to 0.3 mm greater than the diameter of the molds.

14. The method of claim 12 wherein the ratio of weight to volume of said object to a single mold is greater than 3.

15. The method of claim 12 wherein the weight per unit volume of said object is greater than 7 g/cm$^3$.

16. The method of claim 12 wherein said object is fabricated from a metal or metal alloy selected from the group consisting of tungsten, tantalum, lead, bismuth, nickel, copper, steel, bronze, brass, Monel allow, lead-antimony and chromium-nickel.

17. The method of claim 12 wherein said object is a casting mold filled with a metal or metal alloy.

18. The method of claim 12 wherein said metal alloy is Wood's metal.

19. The method of claim 12 wherein said object is insert between successive series of molds.

20. The method of claim 12 wherein several objects are inserted between successive series of molds.

* * * * *